United States Patent Office 3,123,439
Patented Mar. 3, 1964

3,123,439
AMMONIUM BROMIDE COMPOSITION
Elmer L. McMaster and Floyd B. Nagle, both of Midland, Mich., assignors to The Dow Chemical Company, Midland, Mich., a corporation of Delaware
No Drawing. Filed Nov. 17, 1961, Ser. No. 153,188
8 Claims. (Cl. 23—100)

This invention relates to ammonium bromide, and more particularly, to a corrosion inhibited ammonium bromide product and its method of preparation.

Ammonium bromide is corrosive to metals. This corrosiveness greatly limits the utility of the material. The material is hydroscopic and also sublimes at room temperature so that a metal in contact with the solid ammonium bromide or an atmosphere exposed to ammonium bromide will corrode extensively. Ammonium bromide has desirable properties in that when it is dispersed in plastic material it imparts fire resistant properties to the plastic. However, due to the corrosiveness of the material it is finding limited use for this purpose. It is difficult to store and also corrodes the equipment used in molding or extruding the plastic material containing the ammonium bromide.

In addition to its corrosiveness ammonium bromide has another undesirable property which further limits its use as a fireproofing agent in plastics. Due to the hydroscopic properties of the ammonium bromide and its sublimation, ammonium bromide upon storage tends to cake or agglomerate and is difficult to disperse. To disperse the ammonium bromide evenly in a plastic material, it is essential that the particles of the ammonium bromide be of a small size, preferably less than 40 microns. When larger particles are used or when the ammonium bromide is not adequately dispersed, formation of specks or rough spots on the surface of the fabricated plastic article is obtained. This adversely affects the appearance and saleability of the items. Thus, it is desirable to have an ammonium bromide product which is inhibited to decrease its corrosiveness and also a method for the preparation of this product in a fine particle size.

It is the principal object of this invention to provide an inhibited composition of ammonium bromide to inhibit its corrosion of metals. A further object is to provide a free-flowing ammonium bromide product in small particle size which will not cake or stick together upon storage. A still further object is to provide a method for the preparation of the inhibited ammonium product which is free-flowing and of small particle size.

The above and other objects are attained according to the invention by intimately intermixing from 0.5 to 15 weight percent, based upon ammonium bromide, of a vinylbenzyl sulfonate. When the above compound is intermixed with ammonium bromide the corrosiveness of the ammonium bromide is inhibited. The solid particles of ammonium bromide in contact with the metal will not corrode the metal nor will an aqueous solution of the product be corrosive to the metal.

The various known methods for intimately intermixing two materials may be used in the formation of the inhibited ammonium bromide product. Generally, the most convenient methods of intermixing the additaments with the solid ammonium bromide is to add the additament to the ammonium bromide and then grind the mixture to obtain uniform distribution of the additament throughout the ammonium bromide. Spray drying of ammonium bromide solutions or emulsions containing the additament may be also used as a method to obtain the inhibited product.

Spray drying of ammonium bromide solutions or emulsions to which the additaments have been added has a further advantage in that a fine, free-flowing product of ammonium bromide is obtained. The particles obtained are in the range of a micron size and do not cake or adhere together. Thus spray drying provides a convenient method of not only dispersing the inhibitor into the ammonium bromide, but the inhibitor serves an additional function of producing a fine free-flowing product. Spray drying of ammonium bromide solutions to obtain fine particles of the ammonium bromide without the addition of the additaments is not satisfactory. The particles obtained by spray drying cake or adhere together as soon as they are formed. Thus large particles are obtained or the particles adhere together making it difficult to disperse them in plastic materials without the formation of specks or rough spots on the surface of the material.

In preparing the stabilized ammonium bromide product by spray drying, an aqueous ammonium bromide solution to which the additament has been added is used. Since vinylbenzyl sulfonates are generally soluble in aqueous solutions, the additament is dissolved therein. The various known spray drying equipment may be used.

The vinylbenzyl sulfonates which are effective may be represented by the general formula:

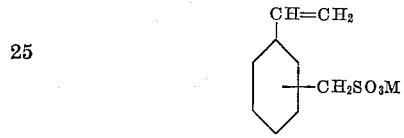

where M represents an element selected from the group consisting of alkali metals, alkaline earth metals, and hydrogen. The alkali metal salts with the sulfonic group being located in the ortho or para positions are preferred.

The amount of the additament intermixed with the ammonium bromide may be widely varied. An amount of from 0.5 to 15 weight percent is generally sufficient to inhibit the corrosiveness of the ammonium bromide. The same amount is also sufficient to impart the free-flowing non-caking characteristics to the particles when the ammonium bromide product is obtained by spray drying. It is preferred to use from 1 to 3 weight percent of the additament.

The following example further illustrates the invention.

*Example*

An aqueous solution was prepared which contained 20.4 weight percent ammonium bromide, 2 weight percent of a mixture of the sodium salts of o- and p-vinylbenzyl sulfonic acids and the remainder water. The solution was spray dried in a spray drying unit at a rate of 1 gallon per hour. The spray drier was operated at an inlet temperature of 350° C. and an outlet temperature of 105° to 115° C. The product obtained, containing 90.3 percent ammonium bromide, was white in color and free-flowing. It had an average particle size of approximately 1 micron. When stored in a sealed bottle for approximately 1 year the ammonium bromide remained white in color and free-flowing.

To show the effect of the vinylbenzyl sulfonate as a corrosion inhibitor, a mild steel coupon, approximately ½ inch wide and 1 inch long of ⅛ inch thick stock, was placed in a petrie dish and covered with the ammonium product containing approximately 10 percent of the vinylbenzyl sulfonate. The petrie dish was suspended over water in a closed dessicator and maintained at room temperature. The mild steel coupon was weighed prior to exposure to the ammonium bromide product and cleaned and reweighed after the exposure to determine the loss of metal obtained. With the product containing the vinylbenzyl sulfonate a loss of .0012 gram per day was obtained. When a mild steel coupon of substantially the same dimensions as above was exposed, in a similar manner to that above, to ammonium bromide containing no additament, a corrosion loss of weight of .054 gram per day was obtained.

Similar results are obtained with vinylbenzyl sulfonates of other metals and also with the acid.

This application is a continuation-in-part of application Serial No. 9,181, filed February 17, 1960, now Patent No. 3,037,842.

What is claimed is:

1. A free-flowing composition of matter which comprises ammonium bromide intimately intermixed with from 0.5 to 15 weight percent, based on said ammonium bromide, of a vinylbenzyl sulfonate having a general formula:

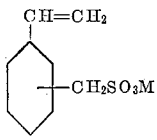

where M represents an element selected from the group consisting of alkali metals, alkaline earth metals and hydrogen.

2. A free-flowing composition of matter according to claim 1 wherein the vinylbenzyl sulfonate is intimately intermixed with the ammonium bromide in an amount of from 1 to 3 weight percent, based on said ammonium bromide.

3. A free-flowing composition of matter according to claim 2 wherein the vinylbenzyl sulfonate is an alkali metal salt of p-vinylbenzyl sulfonic acid.

4. A free-flowing composition of matter according to claim 2 wherein the vinylbenzyl sulfonate is an alkali metal salt of o-vinylbenzyl sulfonic acid.

5. In a process for the spray drying of ammonium bromide aqueous solutions, the step to produce a free-flowing product of the ammonium bromide, which comprises intermixing with the ammonium bromide aqueous solution from 0.5 to 15 weight percent, based upon the ammonium bromide, of a vinylbenzyl sulfonate having the general formula:

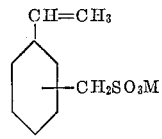

where M represents an element selected from the group consisting of alkali metals, alkaline earth metals and hydrogen.

6. A process according to claim 5 wherein the vinylbenzyl sulfonate is intermixed with the ammonium bromide aqueous solution prior to spray drying in amount of from 1 to 3 weight percent, based upon the ammonium bromide.

7. A process according to claim 6 wherein the vinylbenzyl sulfonate is an alkali metal salt of p-vinylbenzyl sulfonic acid.

8. A process according to claim 6 wherein the vinylbenzyl sulfonate is an alkali metal salt of o-vinylbenzyl sulfonic acid.

References Cited in the file of this patent
UNITED STATES PATENTS

| | | |
|---|---|---|
| 2,616,786 | Whetstone | Nov. 4, 1952 |
| 2,797,982 | McKinney | July 2, 1957 |
| 2,944,936 | Bronson | July 12, 1960 |